United States Patent [19]

Williams et al.

[11] E Re. 30,701

[45] Reissued Aug. 11, 1981

[54] BUTTON LOCKING DEVICE

[76] Inventors: Ben Williams; George H. Miller, both of 3955 N. Murray Ave., Shorewood, Wis. 53211

[21] Appl. No.: 905,928

[22] Filed: May 15, 1978

Related U.S. Patent Documents

Reissue of:

[64] Patent No.: 4,043,006
Issued: Aug. 23, 1977
Appl. No.: 553,158
Filed: Mar. 17, 1975

[51] Int. Cl.[2] ..... A44B 1/00; A44B 1/18

[52] U.S. Cl. ..... 24/90 R; 24/90.5; 24/102 E; 24/202.1

[58] Field of Search ..... 24/209, 210, 73 GS, 24/73 R, 90 R, 90.5, 102 E, 202.1; 2/117, 230, 304, 251, 252, 247

[56] References Cited

U.S. PATENT DOCUMENTS

| | | | |
|---|---|---|---|
| 81,300 | 8/1868 | Sedgwick | 24/90.5 |
| 157,323 | 12/1874 | Gray | 24/93 |
| 339,896 | 4/1886 | Kauffmann | 24/58 |
| 440,371 | 11/1890 | Schloss | 24/202.1 |
| 450,510 | 4/1891 | Heuser | 24/202.1 |
| 617,074 | 1/1899 | Blumenthal | 24/202.1 |
| 716,198 | 12/1902 | Davis | 2/230 |
| 908,787 | 1/1909 | Low | 24/90.5 |
| 1,218,941 | 3/1917 | Hodes | 2/265 |
| 1,232,633 | 7/1917 | Webber | 24/73 GC |
| 1,260,217 | 3/1918 | Levy | 2/251 |
| 1,384,526 | 7/1921 | Keeton | 24/90.5 |
| 1,573,860 | 2/1926 | Purinton | 24/90 R |
| 1,892,610 | 12/1932 | Dawes | 24/73 A |
| 2,383,746 | 8/1945 | Shapiro | 2/247 |
| 2,899,731 | 8/1959 | Maxim | 24/202.1 |
| 2,952,315 | 9/1960 | Brontman | 160/330 |
| 2,983,006 | 5/1961 | Schafer | 24/73 A |

FOREIGN PATENT DOCUMENTS

| | | | |
|---|---|---|---|
| 114061 | 8/1929 | Australia | 24/90.5 |
| 247946 | 11/1910 | Fed. Rep. of Germany | 24/210 |
| 621727 | 11/1935 | Fed. Rep. of Germany | 24/102 E |
| 452821 | 1/1913 | France | 24/210 |
| 9102 | of 1898 | United Kingdom | 24/90 R |
| 24859 | of 1903 | United Kingdom | 24/90.5 |
| 438355 | 11/1935 | United Kingdom | 24/58 |

*Primary Examiner*—Ramon S. Britts

[57] ABSTRACT

A flexible looped buttoning device for use on garments and other items of fabric to safeguard against the involuntary opening or separation of two or more buttoned fabrics.

13 Claims, 9 Drawing Figures

BUTTON LOCKING DEVICE

Matter enclosed in heavy brackets [ ] appears in the original patent but forms no part of this reissue specification; matter printed in italics indicates the additions made by reissue.

BACKGROUND OF THE INVENTION

The present invention relates generally to fabric closing and securing devices and more particularly to a buttonlock loop securing a button which has been inserted through a button hole in a fastened position.

Recently, a means has been sought for a locking device which would act as a safeguard against the involuntary opening of pockets and other joinings of material which, until now, have been secured by the universally known and used system of button and button hole. While many devices have been developed over the century to accomodate the use and positioning of buttoning devices, few if any have addressed themselves to the problem of securing and protecting against the involuntary opening of two articles of fabric positioned and mated together by the button and the button hole system. For example, Schwarz, U.S. Pat. No. 530,130, appears to disclose a waistband fastening device for attaching shirt waists to trousers. The Schwarz patent primarily addresses itself to the development of a looped retaining mechanism which is to be attached directly to the material providing for the user a protruding flexible loop into which said user can button the shirt waist. One of the purposes of the Schwarz patent is to avoid previously used material clips which often discolored and tore out of the material while developing a loop holder which when strained, seats itself even more securely into the material so as to prevent removal of the loop securing device from the material. Another patent, Green, U.S. Pat. No. 553,645, for the most part addresses itself to the means for securing the loops of elastic cord to the waistbands of boys short trousers and the like. One of the objects of this particular patent is to provide improved means whereby such loops can be held securely in position at all times without being liable to be cut as to the rubber core by the puncture by a needle or by tightly drawn stitches. Here, as with the previous Schwarz patent, emphasis seems to be placed on the securing plate and the method for installation upon the fabric itself. In the Green patent, a series of stitching procedures is identified towards mounting a loop securing device to the material. Similarly, the Bloomenthal, U.S. Pat. No. 617,074 button loop, seems to provide a button loop which can be readily sewn to a garment or waist band consisting essentially of an elastic band secured in the shank attached to or preferably formed integrally with the button. The problem the Bloomenthal button loop apparently addresses itself to is the sewing of said loop to a waist band or garment more readily, quickly, and at a lower cost than when the shank was formerly riveted or fastened by means of a clamping machine.

Other inventions have usually focused up on loop-button fastening arrangements in areas differing from that of the present device. One such use seems to be disclosed by Davis, U.S. Pat. No. 716,198 which primarily relates to improvements in garment supporters and more particularly to the attachments of trousers for supporting under garments. In the Davis patent, loops fixed on the inside waistband of trousers with buttons affixed next to them, provided means for the insertion of still yet other loops of under garments through the interior loops of the trousers for final attachment to the buttons. This allowed secure attachment and support to the interior fabric of the trousers. Another loop device disclosed in Dawes, U.S. Pat. No. 1,892,610 apparently relates to an elongating and constricting sleeve through which another end of the loop is passed and secured by knotting so as to anchor said end of loop within said constricting sleeve. The Dawes patent primarily discloses a means by which adjustability is acquired on the looped fastening device. The adjustability for lengthening or shortening the fastening device was considered a desirable characteristic allowing freedom from injurious effect on the person or garments of the wearer. The Dawes patent also seems to disclose the capability to attach said fastener to one portion of a garment on another article of fabric and yet be capable of adjustment to vary the effective length of the fastener and/or to adapt the latter for releasable attachment to or about objects.

Another invention, disclosed in Berg, U.S. Pat. No. 2,608,691, relates primarily to a blouse holding device which may also be employed for securing a sanitary napkin. One of the objects of this invention is the provision of an improved holder by means of which a ladies blouse may be secured or anchored in such manner that it is pulled downward automatically, the pull being exerted upon the garter of the user. Another object of the Berg patent seems to be the provision of an improved securing device which is adapted to be used for securing a sanitary napkin at both of its ends to the adjacent parts of another garment, such as a panty, in such manner that no bulges or unevenness will appear because of the smooth, flat nature of the securing devices embodied in the invention; as well as the provision of an improved securing device which can be used to secure light, thin, and fragile fabrics to which it is secured or anchored without likelihood of tearing or slipping and which also does not produce any unsightly bulges or knots that would be visable on the outside of the garments of the user. In the Berg patent, a flat anchoring plate is used to secure the disk or button attached to the garment being held. The anchoring plate was to be made of various shapes with preferably rounded corners and very thin, with a centrally located elongated narrow slot. In one of its uses, the Berg invention attaches the stocking and garter of ladies apparel to the ladies blouse pulling down on the blouse to keep it from creeping upward out of the wearer's skirt. The device utilized three elements, a tension member, a securing disk, and a slotted anchor plate to accomplish its purported purpose.

Of the prior art examined, most attempts to improve fastening devices have been through the utilization of loops and clamps affixed directly to the wearer's apparel with either improved clamping devices, more easily to install attachment loops, hidden garment clamping features so as to support a wearer's under garments or prevent the creeping up of tucked-in outer apparel, and means through which a fastening loop can be shortened or elongated through the use of adjustable garment fasteners.

Little of the prior art examined addresses itself to the area in which the present invention is disclosed. This area deals with the use of a loop, either connected by an appendage to a button or integrally manufactured into the button, through which security is acheived so as to avoid the opening of a button when it is affixing two garments together. Besides acting as a safeguard against the involuntary opening of a button-button hole combination, the present invention also offers an inexpensive, as well as decorative safeguard for the user. With a small portion of the loop exposed when the present invention is used to secure and safeguard against involuntary opening, use of contrasting color and texture into the elastic nylon loop, would offer the user distinctive as well as decorative trim on the user's wearing apparel. The use of the button lock disclosed in the present invention is not restricted to articles of clothing but rather is usable in a similar manner in all areas of fabric fastening where the button and button hole is used such as luggage and sports equipment.

It is therefore the object of the present device to attractively and inexpensively secure two or more buttoned fabrics together while preventing involuntary opening and separation of these fabrics.

SUMMARY OF THE INVENTION

The present invention is a looped fastening device for securing two or more buttoned fabrics in a juxtaposed position from involuntary unbuttoning comprising a shaped loop body and means for attaching said loop body to the underside of a button from which said loop body projects to be manipulated over and behind an exposed button which has been buttoned through a button hole. One such embodiment of the present invention provides for the button lock loop to be attached to a small circular disked appendage, for attachment to or installation behind the reverse side of a button as the button attaches to the first piece of fabric. A second embodiment, exists in manufacturing the loop body itself into or onto the button as an integral part during the manufacture of the button. It is contemplated that the appendage piece attaching the loop to the back of a button is to be utilized on buttons that are of minimum size and thickness which would make it difficult to integrally incorporate said loop body onto or into the button itself. Thus, instead of the loop projecting from the button itself, it would instead project outward from an appendage behind the button, anchored firmly in that position by the same fastening devices, thread, rivot, pin, that firmly attach and restrain the button in its position. In the embodiment disclosing the loop body as an integral part of the button, it would protrude in a similar manner except that the protruding loop body would not project from an appendage behind the button but rather from the button itself.

The use of the present invention as a securing device to prevent involuntary opening or separation of the first and second pieces of fabric being joined is accomplished through directing said loop outward after the button attached to the first piece of fabric has been slipped through the button hole on the second piece of fabric. At that point in the fastening operation, said loop body is manipulated over the exposed button surface thus providing a double lock for the button, preventing the button from slipping through the button hole and releasing the first and second pieces of fabric from contact.

The exposed portion of the protruding loop body which has not been hidden under the button after the rest of the loop has securely been placed behind the button can be utilized as decorative trim in any of the uses of embodiments specified depending on the choice of colors and/or styles used in the construction of the elastic nylon loop.

BRIEF DESCRIPTION OF THE DRAWINGS

FIG. 6 is a front elevational view of a button-button hole combination on a first and second piece of fabric which have yet to be buttoned.

DETAILED DESCRIPTION

Figure 1:
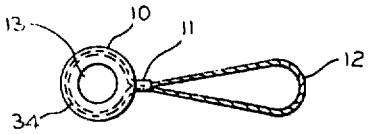
FIG. 1 is a top plan view of the present invention in the first embodiment where the loop body is attached to the circular disked appendage.

While this invention is susceptible of embodiment in many different forms, there is shown in the drawings and will herein be described in detail, two specific embodiments, with the understanding that the present disclosure is to be considered as an exemplification of the principles of the invention and is not intended to limit the invention to the embodiments illustrated.

Figure 2:
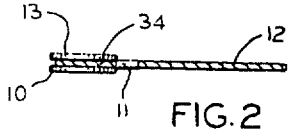
FIG. 2 is a side elevational view of the present invention in the first embodiment.
Figure 3:
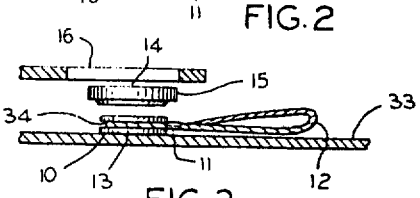
FIG. 3 is an exploded view schematic of the loop appendage in position behind the button.

FIGS. 1, 2, and 3 of the drawings represent the construction and, finally, the application of the first embodiment of the present invention. The first embodiment itself emcompasses the use and installation of a loop body appendage which makes it possible to attach the loop body to a button, where the button cannot be prefabricated with the loop body as an integral part.

In FIGS. 1 and 2, a flexible link such as elastic loop 12 is wound around flat disk spool 10 having center 13. The loop body is gathered as it comes off the spool by a metal crimp 11. The gathering crimp at this location retains one end of the loop body on the cylindrical spool while permanently shaping the looped orifice described by the remainder of the flexible cord for fastening onto a button. The phantom outline of the flexible cord 34 describes the position of the cord while it is sandwiched in by the flanges of the cylindrical spool. In FIG. 3, a demonstration of application is illustrated showing the entire appendage assembly 10, 11, 12, 13, and 34 in an exploded view behind sample button 15 before button 15 is inserted into button hole 16. Final assembly of the appendage to the button includes the anchoring of the loop body appendage and button by means of sewing, riveting, or pinning, to fabric 33. While both appendage and button 15 can be anchored along side one another without acutal fusing, our particular embodiment recommends fabrication of the loop appendage to the button before attachment to the fabric. Once the button and appendage are connected and finally attached to fabric 33, the entire assembly is ready for buttoning onto a second fabric through the means of button hole 16.

Figure 4:
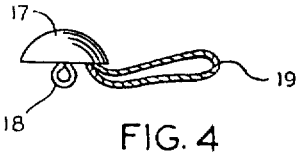
FIG. 4 is a side elevational view of the second embodiment of the invention showing the loop body as an integral part of a fabricated button.
Figure 5:
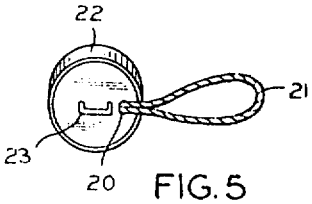
FIG. 5 is a bottom perspective view of another type of button utilizing the second embodiment in which the loop body is an integral part of the button.

FIG. 4, illustrates an example of the second embodiment set forth in the specification. In this particular embodiment, the elastic loop body is made an integral part of the button itself during itself during fabrication of the button and thus, does not require an actual appendage which must be attached to the back of the button before use of the present invention. Fabricated button 17 is shown with elastic loop 19 that has been anchored within it upon fabrication. Means 18 for attaching said button 17 to a fabric are similarly shown. Another example of a button possessing the loop body from fabrication is shown in FIG. 5. Here button 22 displays loop body 21 protruding from its underside at point 20. Sewing hook 23 is shown as means for attaching the button to the first article of fabric.

Figure 6:
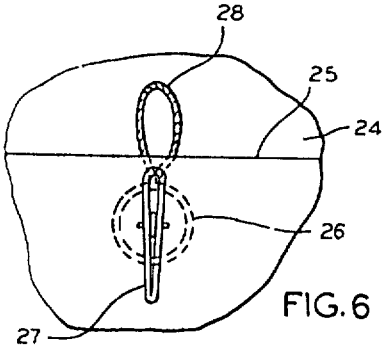
FIG. 6 is the first of a series of three elevational side views representing the use of the present invention.
Figure 7:
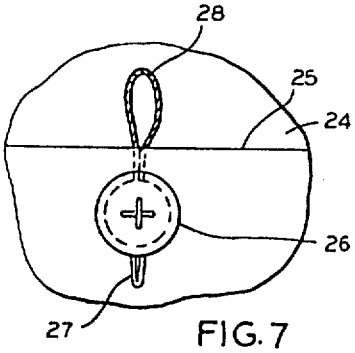
FIG. 7 is the second of a series of three figures showing a side elevational view of the present invention on a button-button hole combination. Here the fabrics have been buttoned together.
Figure 8:
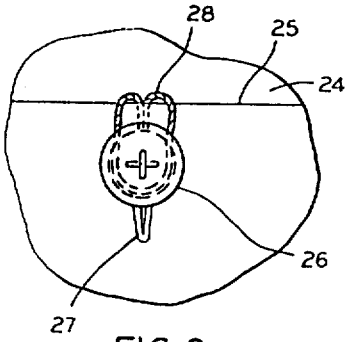
FIG. 8 is a side elevational view and the third and last illustration of the series of three, showing the use of the loop body in operation on a standard button and button hole device. This illustration depicts the present invention in use as described by either of the two embodiments.

FIGS. 6 through 8 illustrate in a schematic series the actual usage of the button loop body which would be typical. In FIG. 6, fabric 24 shown in phantom and fabric 25 will be joined by the usual means of buttoning. In this application, button 26 has not yet been inserted through button hole 27 on fabric 25. In FIG. 7, button 26 has been inserted through button hole 27 on fabric 25 and elastic loop body 28 is shown protruding from fabric 24 underneath fabric 25 awaiting installation. FIG. 8 demonstrates final usage of protruding elastic loop 28 as it is drawn down over and finally inserted under button 26. At this point, button 26 is locked in, not only by button hole 27, but also by loop body 28, and fabric 25 is protected from involuntary opening or release from fabric 24.

Figure 9:
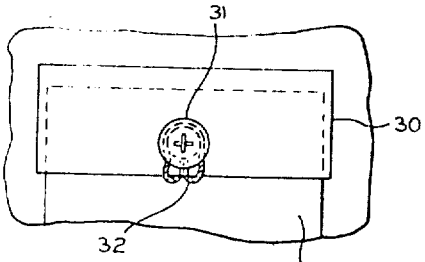
FIG. 9 is a side elevational view of the present invention in application on a button-button hole configuration on two articles of fabric comprising what is ordinarily known as a "flap" pocket.

FIG. 9 illustrates another use of the button lock loop on what is commonly referred to as a "flap" pocket. Here button 31 has been buttoned through the button hole of flap 30. At this point, loop body 32 has been extended over the button and locked behind it thus securing the flap pocket from involuntary opening or separation from pocket 29 shown in phantom.

The foregoing description and drawings merely explain and illustrate the invention and the invention is not limited thereto, except in so far as the appended claims are so limited, as those skilled in the art who have the disclosure before them will be able to make modifications and variations therein without departing from the scope of the invention.

What is claimed is:

1. In the combination of a first fabric with a button permanently fastened thereto and a second fabric with an edge and a button hole adjacent said edge for receiving said button therethrough and to expose said button beyond said second fabric whereby to releasably button the two fabrics together, the improvement for locking the two fabrics together notwithstanding release of the button from the button hole and comprising a flexible link, means permanently securing one end of the flexible link to the first fabric, said flexible link extending between said fabrics from said button and being looped over the edge of the second fabric and said other end of the flexible link encircling exposed button whereby to lock the two fabrics together notwithstanding release of the button from the button hole.

2. The device of claim 1 in which the flexible link comprises an elastic cord having one end secured to the button and hence to the first fabric, said means for securing the other end of the flexible link about the button comprising a loop formed in the said other end to engage about said button.

3. The device of claim 1 in which said means for securing one end of the flexible link to the first fabric comprises attaching means connecting said end integrally to said button, and hence to said first fabric.

4. The device of claim 3 in which said button has an underside with an opening, said attaching means comprising means locking said one end of the flexible link into the interior of the button and through said opening.

5. The device of claim 3 in which said button is provided with a hook by which it is fastened to said first fabric.

6. The device of claim 1 in which said means for securing one end of the flexible link to the first fabric comprises an appendage between said button and said first fabric and secured thereby by said button.

7. The device of claim 6 in which said appendage comprises a disk concentric with the button and having a central opening, said button being fastened to said first fabric by anchoring means extending through said opening.

8. The device of claim 7 in which said disk has a grooved rim in which said flexible link is received.

9. The device of claim 1 in which said button is provided with a hook by which it is fastened to said first fabric.

10. The device of claim 1 in which said button is provided with a plurality of orifices through said button for receiving thread by which the button is fastened to said first fabric.

*11. In the combination of a first fabric with a button permanently fastened thereto and a second fabric with a button hole for receiving said button therethrough and to expose such button beyond said second fabric whereby to releasably button the two fabrics together, the improvement for locking the two fabrics together notwithstanding release of the button from the button hole and comprising a flexible link, anchor means anchoring one end of the flexible link to one of said fabrics, the other end of the flexible link comprising a loop encircling the exposed button whereby to be retained by the button in the event that the button slips through the button hole and to link the two fabrics together notwithstanding release of the button from the button hole, said second fabric having an edge adjacent the button hole, said flexible link being looped over the edge of the second fabric from its connection to said anchor means to its loop encircling the exposed button.*

*12. The combination of claim 11 in which said anchor means is anchored to said first fabric.*

*13. The combination of claim 12 in which said anchor means is also anchored to said button.*

* * * * *